US011216673B2

(12) United States Patent
Behrendt

(10) Patent No.: US 11,216,673 B2
(45) Date of Patent: Jan. 4, 2022

(54) DIRECT VEHICLE DETECTION AS 3D BOUNDING BOXES USING NEURAL NETWORK IMAGE PROCESSING

(71) Applicant: Robert Bosch GmbH, Stuttgart (DE)

(72) Inventor: Karsten Behrendt, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 16/500,155

(22) PCT Filed: Mar. 29, 2018

(86) PCT No.: PCT/EP2018/058033
§ 371 (c)(1),
(2) Date: Oct. 2, 2019

(87) PCT Pub. No.: WO2018/184963
PCT Pub. Date: Oct. 11, 2018

(65) Prior Publication Data
US 2020/0349365 A1 Nov. 5, 2020

Related U.S. Application Data

(60) Provisional application No. 62/481,346, filed on Apr. 4, 2017.

(51) Int. Cl.
G06K 9/00 (2006.01)
B60R 1/00 (2006.01)
(Continued)

(52) U.S. Cl.
CPC ............ *G06K 9/00805* (2013.01); *B60R 1/00* (2013.01); *B60W 10/18* (2013.01); *B60W 10/20* (2013.01);
(Continued)

(58) Field of Classification Search
CPC .. G06K 9/00805; G06K 9/033; G06K 9/2081; G06K 9/6262; G06K 9/3233;
(Continued)

(56) References Cited

U.S. PATENT DOCUMENTS 8,874,267 B1 10/2014 Dolgov et al.
9,070,202 B2 6/2015 Chandraker et al.
(Continued)

FOREIGN PATENT DOCUMENTS

WO 2017027030 A1 2/2017

OTHER PUBLICATIONS

Xiaozhi Chen et al: "Multi-view 30 Object Detection Network for Autonomous Driving", arxiv.org, Nov. 23, 2016 (Nov. 23, 2016), XP055474745, Retrieved from the Internet: URL:https://arxiv.org/pdf/1611.07759vl.pdf.
(Continued)

*Primary Examiner* — Dhaval V Patel
(74) *Attorney, Agent, or Firm* — Michael Best & Friedrich LLP

(57) ABSTRACT

Systems and methods of detecting and tracking one or more vehicles in a field of view of an imaging system using neural network processing. An electronic controller receives an input image from a camera mounted on the host vehicle. The electronic controller applies a neural network configured to output a definition of a three-dimensional bounding box based at least in part on the input image. The three-dimensional bounding box indicates a size and a position of a detected vehicle in a field of view of the input image. The three-dimensional bounding box includes a first quadrilateral shape outlining a rear or front of the detected vehicle and a second quadrilateral shape outline a side of the detected vehicle.

16 Claims, 7 Drawing Sheets

(51) Int. Cl.
| | |
|---|---|
| *B60W 10/18* | (2012.01) |
| *B60W 10/20* | (2006.01) |
| *B60W 30/14* | (2006.01) |
| *B60W 30/18* | (2012.01) |
| *B60W 50/14* | (2020.01) |
| *G05D 1/02* | (2020.01) |
| *G06K 9/03* | (2006.01) |
| *G06K 9/20* | (2006.01) |
| *G06K 9/62* | (2006.01) |
| *G06N 3/04* | (2006.01) |
| *G06N 3/08* | (2006.01) |

(52) U.S. Cl.
CPC .... *B60W 30/143* (2013.01); *B60W 30/18163* (2013.01); *B60W 50/14* (2013.01); *G05D 1/0223* (2013.01); *G06K 9/033* (2013.01); *G06K 9/2081* (2013.01); *G06K 9/6262* (2013.01); *G06N 3/04* (2013.01); *G06N 3/08* (2013.01); *B60R 2300/10* (2013.01); *B60R 2300/20* (2013.01); *B60W 2050/146* (2013.01); *B60W 2420/42* (2013.01); *G05D 2201/0213* (2013.01)

(58) Field of Classification Search
CPC .... G06K 9/4628; G06K 9/00201; B60R 1/00; B60R 2300/10; B60R 2300/20; B60W 10/18; B60W 10/20; B60W 30/143; B60W 30/18163; B60W 50/14; B60W 2050/146; B60W 2420/42; G05D 1/0223; G05D 2201/0213; G06N 3/04; G06N 3/08
See application file for complete search history.

(56) References Cited

U.S. PATENT DOCUMENTS

| | | | |
|---|---|---|---|
| 9,396,553 | B2 | 7/2016 | Fan et al. |
| 9,568,611 | B2 | 2/2017 | Cosatto et al. |
| 2013/0322691 | A1* | 12/2013 | Guan ................. G06K 9/00805 382/103 |
| 2016/0054452 | A1 | 2/2016 | Cosatto et al. |
| 2016/0125249 | A1 | 5/2016 | Mei et al. |
| 2016/0335798 | A1 | 11/2016 | Datta et al. |
| 2017/0011281 | A1 | 1/2017 | Dijkman et al. |
| 2017/0024889 | A1 | 1/2017 | Brown et al. |
| 2018/0108137 | A1* | 4/2018 | Price ........................ G06T 7/11 |

OTHER PUBLICATIONS

Bo Li: "30 Fully Convolutional Network for Vehicle Detection in Point Cloud", Jan. 16, 2017 (Jan. 16, 2017), XP055474739, Retrieved from the Internet: URL:https://arxiv.org/pdf/1611.08069.pdf.

Arsalan Mousavian et al: "30 Bounding Box Estimation Using Deep Learning and Geometry", arxiv.org, Dec. 1, 2016 (Dec. 1, 2016), pp. 1-9, XP055474731, Retrieved from the Internet: URL:https://arxiv.org/pdf/1612.00496vl.pdf.

Anonymous: "Direct manipulation interface", Wikipedia, Dec. 27, 2016 (Dec. 27, 2016), XP002781196, Retrieved from the Internet: URL:https://en.wikipedia.org/w/index.php?t itle=Direct manipulation interface&oldid=7 56947614.

International Search Report and Written Opinion for Application No. PCT/EP2018/058033 dated Nov. 16, 2018 (20 pages).

* cited by examiner

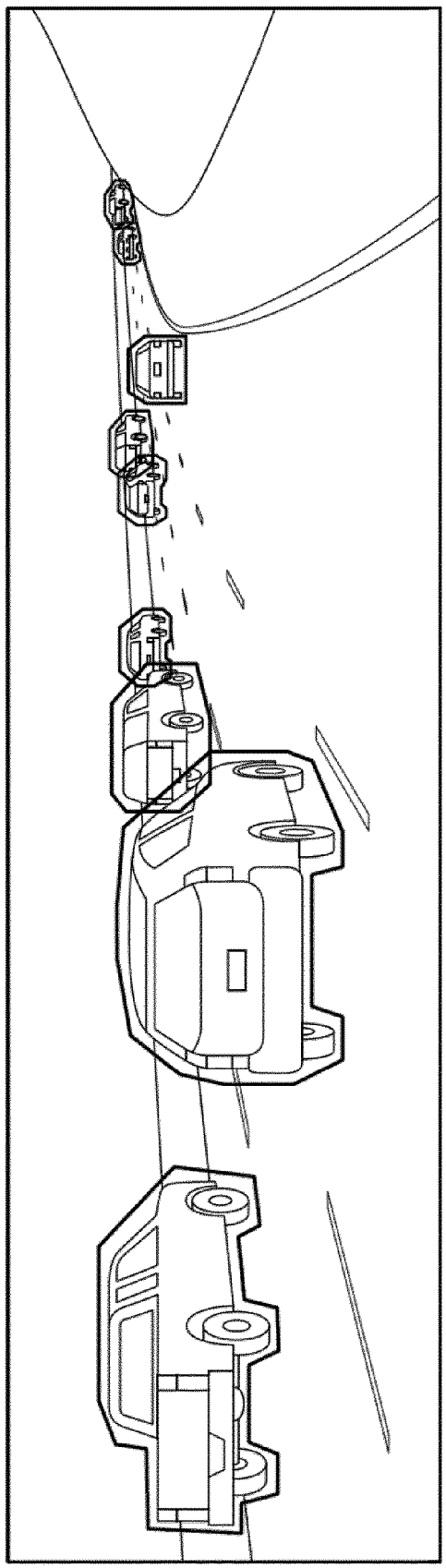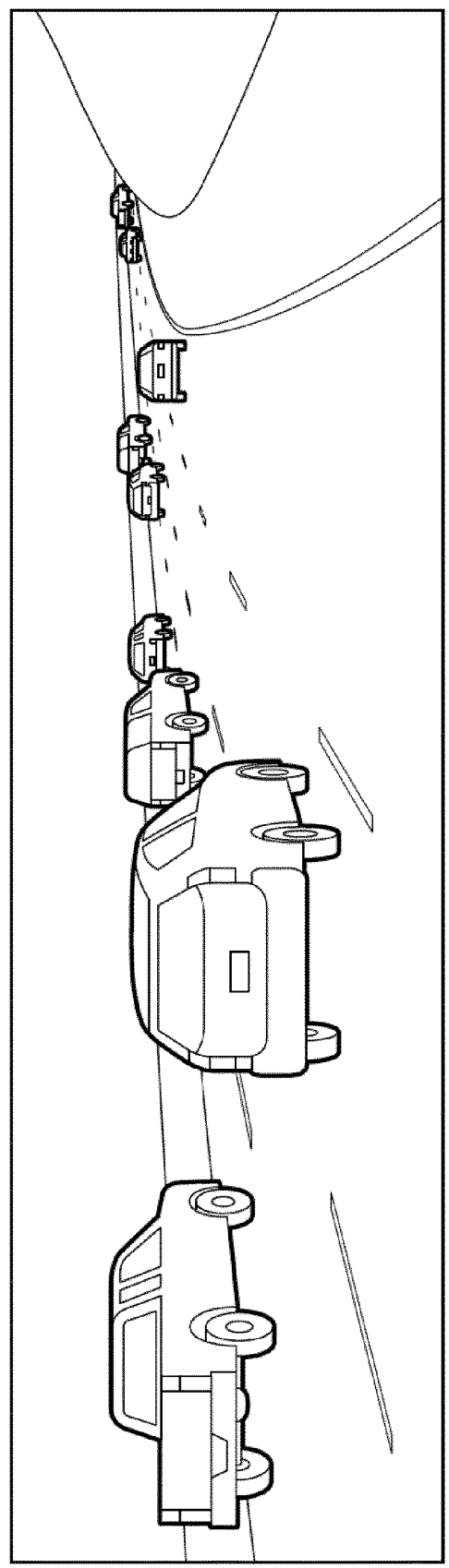

DIRECT VEHICLE DETECTION AS 3D BOUNDING BOXES USING NEURAL NETWORK IMAGE PROCESSING

RELATED APPLICATIONS

This application claims priority to U.S. Provisional Application No. 62/481,346, filed on Apr. 4, 2017, entitled "DIRECT VEHICLE DETECTION AS 3D BOUNDING BOXES USING NEURAL NETWORK IMAGE PROCESSING," the entire contents of which are incorporated herein by reference.

BACKGROUND

The present invention relates to the detection of the presence of other vehicles. Vehicle detection is useful for various systems including, for example, fully or partially automated driving systems.

SUMMARY

In one embodiment, the invention provides systems and methods for detecting and tracking vehicles using a convolutional neural network. An image of an area proximate to a host vehicle is captured. An electronic processor applies the convolutional neural network to process the captured image as an input to the convolutional neural network and to directly output three-dimensional boundary boxes (or "bounding boxes") indicative for the location of all detected vehicles in the captured image. In some embodiments, the output of the convolutional neural network defines the three-dimensional boundary box as a first quadrilateral indicative of a rear or a front of the detected vehicle and a second quadrilateral indicative of a side of the detected vehicle. In some embodiments, the output of the convolutional neural network defines the first quadrilateral and the second quadrilateral as a set of six points. Furthermore, in some embodiments, the system is configured to display the image captured by the camera with the three-dimensional boundary boxes overlaid onto the detected vehicles. However, in other embodiments, the system is configured to utilize the information regarding the size, position, orientation, etc. of the detected vehicles as indicated by the three-dimensional bounding boxes without displaying the bounding boxes to the operator of the vehicle on a screen.

In another embodiment, the invention provides a method of detecting and tracking a vehicle near a host vehicle. An electronic controller receives an input image from a camera mounted on the host vehicle. The electronic controller applies a neural network configured to output a definition of a three-dimensional bounding box based at least in part on the input image. The three-dimensional bounding box indicates a size and a position of a detected vehicle in a field of view of the input image. The three-dimensional bounding box includes a first quadrilateral shape outlining a rear or front of the detected vehicle and a second quadrilateral shape outline a side of the detected vehicle.

In yet another embodiment, the invention provides a vehicle detection system. The system includes a camera positioned on a host vehicle, a display screen, a vehicle system configured to control a movement of the host vehicle, an electronic processor, and a memory. The memory stores instructions that, when executed by the processor, provide certain functionality of the vehicle detection system. In particular, the instructions cause the system to receive an input image from the camera, the input image having a field of view including a roadway surface on which the host vehicle is operating and a neural network is applied to the input image. The neural network is configured to provide an output defining a plurality of three-dimensional bounding boxes each corresponding to a different one of a plurality of vehicles detected in the field of view of the input image. Each three-dimensional bounding box is defined by the output of the neural network as a set of structured points defining a first quadrilateral shape positioned around a rear or front of a detected vehicle and a second quadrilateral shape positioned around a side of the detected vehicle. The first quadrilateral shape is adjacent to the second quadrilateral shape such that the first quadrilateral shape and the second quadrilateral shape share an edge. The system is further configured to display an output image on a display screen. The displayed output image includes at least a portion of the input image and each of the plurality of three-dimensional bounding boxes overlaid onto the input image. The system is also configured to operate the vehicle system to automatically control the movement of the host vehicle relative to the plurality of vehicles based at least in part on the plurality of three-dimensional bounding boxes.

Other aspects of the invention will become apparent by consideration of the detailed description and accompanying drawings.

BRIEF DESCRIPTION OF THE DRAWINGS

FIG. 3 is a screen shot of the image of FIG. 1 where vehicles operating on the roadway are detected and indicated on the display screen using general polygons.

FIG. 4 is a screen shot of the image of FIG. 1 where vehicles operating on the roadway are detected and indicated on the display screen using pixel-level annotations.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
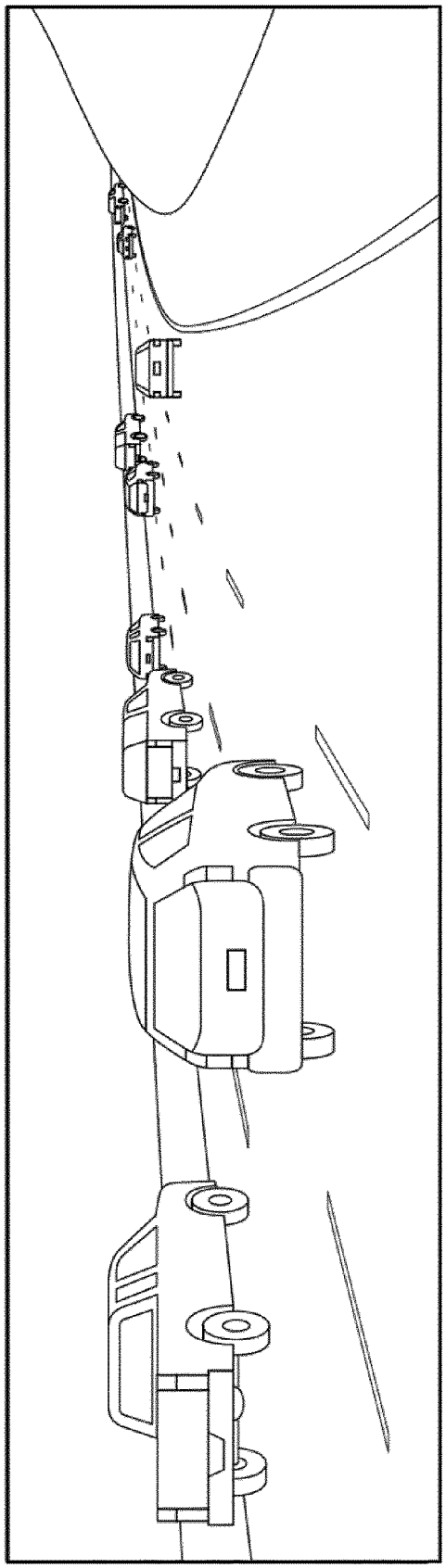
FIG. 1 is a screen shot of an image of a roadway scene captured by a camera mounted to a host vehicle.

FIG. 1 through FIG. 5 illustrate different examples of approaches for detecting vehicles in images captured by a camera mounted to a host vehicle. FIG. 1 illustrates an image of a roadway scene captured by the camera mounted to the host vehicle. The image in this example includes a rectilinear image from the perspective of the host vehicle and includes a plurality of other vehicles operating on the same roadway as the host vehicle within the field of view of the camera. Although the example of FIG. 1 shows a rectilinear image captured by a single camera, in other implementations, the system may include a camera system configured to capture "fish-eye" images of the roadway and/or may include multiple cameras to capture images of the roadway surface with different perspectives and/or fields of view. For example, in some implementations, the camera system may include multiple cameras configured and positioned with fields of view that at least partially overlap with other cameras in the camera system in order to capture/calculate three-dimensional image data of the other vehicles operating on the roadway.

The system, as described in further detail below, is configured to analyze the image (or images) captured by the camera (or cameras) in order to detect the location of other vehicles operating on the same roadway as the host vehicle. In some implementations, the system is configured to detect vehicles and define the shape and location of the detected vehicles by defining a position of a shape corresponding to the detected vehicle in three dimensional space. In some implementations, the image (or images) captured by the camera (or cameras) is output on a display screen with the defined "shape" overlaid onto the image in order to indicate for a user the location of the detected vehicle(s).

Figure 2:
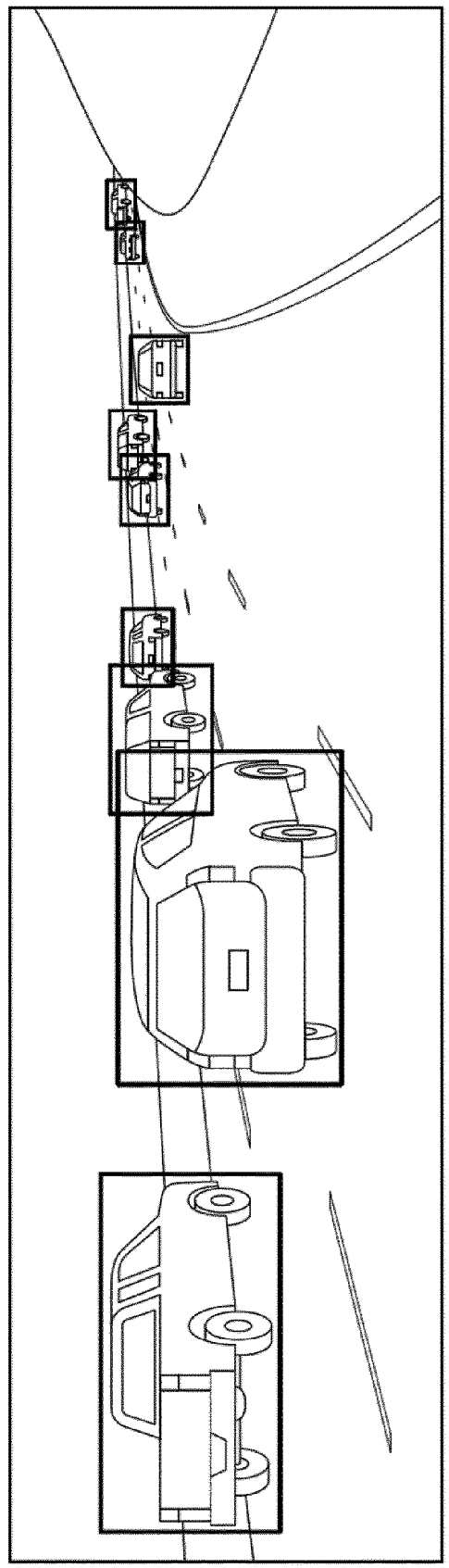
FIG. 2 is a screen shot of the image of FIG. 1 where vehicles operating on the roadway are detected and indicated on a display screen using two-dimensional boundary boxes.

FIG. 2 illustrates a "bounding box" approach in which an image (e.g., the image as captured by the camera in the example of FIG. 1) is processed and two-dimensional rectangles are placed around vehicles detected in the image frame. As discussed in further detail below, an image detection algorithm applied by the vehicle detection system can be tuned, adjusted, and/or trained to place the rectangular boxes such that they fully surround the detected vehicles. In some implementations, the system is configured to use the position and size of the two-dimensional bounding boxes (which are indicative of the size and location of a particular vehicle operating on the roadway) to as input data for operations such as, for example, distance estimation (e.g., between the host vehicle and another detected vehicle), collision checking/warning, dynamic cruise control, and lane change assist. The two-dimensional bounding box approach of FIG. 2 has a relatively low computational cost for operations such as distance estimation and collision checking. However, using two-dimensional bounding boxes results in a relatively large amount of "non-vehicle" space in the bounded area of the image. This is true for axis aligned and non-axis-aligned rectangles. Additionally, the rectangles do not offer any information on the orientation of the detected vehicles with respect to the roadway or the host vehicle.

In the example of FIG. 3, general polygons are used to more closely bound the area of vehicles detected in the images. In this approach, the system is configured to determine a position and size of the detected vehicle in the captured image, but is also configured to identify a generic vehicle shape that most closely corresponds to the shape of the detected vehicle. For example, the system may be configured to store a plurality of generic shapes each indicative of different generic vehicle types—for example, a pick-up truck, a sport utility vehicle, a minivan, etc. When a vehicle is detected in the captured image or images, the system is configured to then identify a shape of the plurality of generic shapes that best corresponds to the detected vehicle. While this approach does more accurately model the detected vehicles, it also increases the computational cost. Every operation performed using the polygon-based models, including the detection itself, is more computationally expensive than using 2D bounding boxes as in the example of FIG. 2.

FIG. 4 illustrates an example in which vehicles are detected in camera images using pixel-level annotations and detections. The example of FIG. 4 shows a heavy line outlining each group of pixels that have been identified as being associated with the body of a vehicle. However, in some implementations, each individual pixel that is identified as being associated with the body of the vehicle is highlighted in a different color (e.g., light gray) so that the body of each detected vehicles appear shaded or highlighted in a different color. By detecting the boundaries and dimensions of a vehicle at an individual pixel level, this method of vehicle detection is more accurate than the 2D bounding boxes or the polygon-based approaches illustrated in FIGS. 2 and 3, respectively. However, this approach again increases the computational complexity. Instead of simply sizing and positioning a generic shape to best fit the detected vehicle, the system is configured to analyze the image to detect and define the actual precise board of the vehicle on a pixel-by-pixel level. Separating individual objects at a pixel-level can take up to several seconds per image and, after separation, the handling of individual vehicles, collision checking, heading calculations, and so on can also be more computationally expensive than the polygon-based approach.

Figure 5:
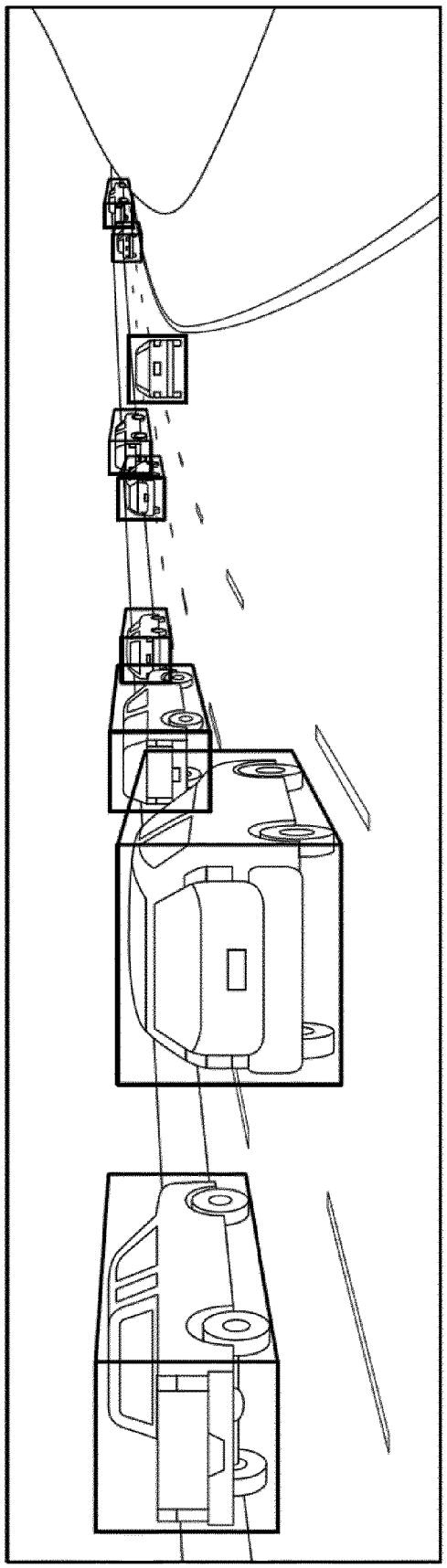
FIG. 5 is a screen shot of the image of FIG. 1 where vehicles operating on the roadway are detected and indicated on the display screen using a combination of two quadrilaterals as a three-dimensional boundary box.

FIG. 5 illustrates yet another vehicle detection mechanism that utilizes a combination of two quadrilaterals: a bounding box identifying the rear (or front) of the vehicle and a corresponding bounding box identifying a single side of the same vehicle. In some implementations, the quadrilaterals in this approach can be simplified to parallelograms and, in freeway driving situations, the two quadrilaterals can be further simplified as a combination of an axis-aligned rectangle and a parallelogram. In some implementations, the system is also configured to determine whether a side of the vehicle visible in the captured image and, if not, the image captured by the camera is annotated with only the visible sides of the vehicle. With fixed frame cameras, only any two sides of a vehicle are visible at any given time-step.

The fixed model of FIG. 5 offers several advantages. It consists of only a few straight planes that can be interpreted as 3D bounding boxes. A range of computer graphics and computer vision algorithms can then be deployed in ways that are very computationally efficient. As a result, processing images using these "3D bounding boxes" requires only a slightly higher computational cost than using the 2D bounding boxes of the example of FIG. 2. The resulting 3D bounding boxes additionally offer information about the detected vehicles' 3D shape, size, and orientation. Furthermore, annotating images for training of systems that are configured to use artificial intelligence (e.g., neural network processing) to detect and define the position of vehicles based on one or more captured images is only slightly more complex than annotating images using 2D bounding boxes.

Figure 6:
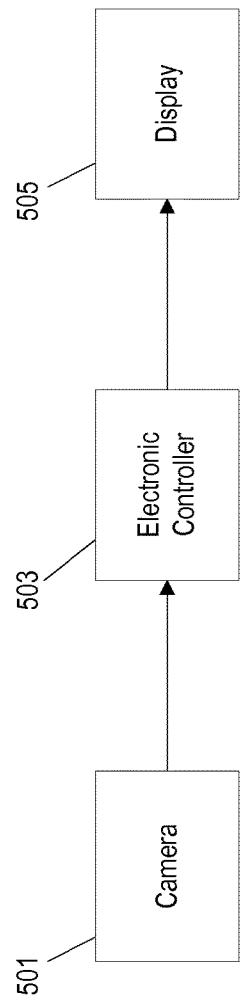
FIG. 6 is a block diagram of a system for detecting vehicles in camera image data.

FIG. 6 is a block diagram of one example of an image processing system for detecting the presence of vehicle using the 3D bounding boxes technique of FIG. 5. Although this and other examples focus on the 3D bounding boxes technique, these examples may, in some implementations, be further adapted to other vehicle identification and annotation techniques including, for example, those illustrated in FIGS. 2 through 4.

Figure 7:
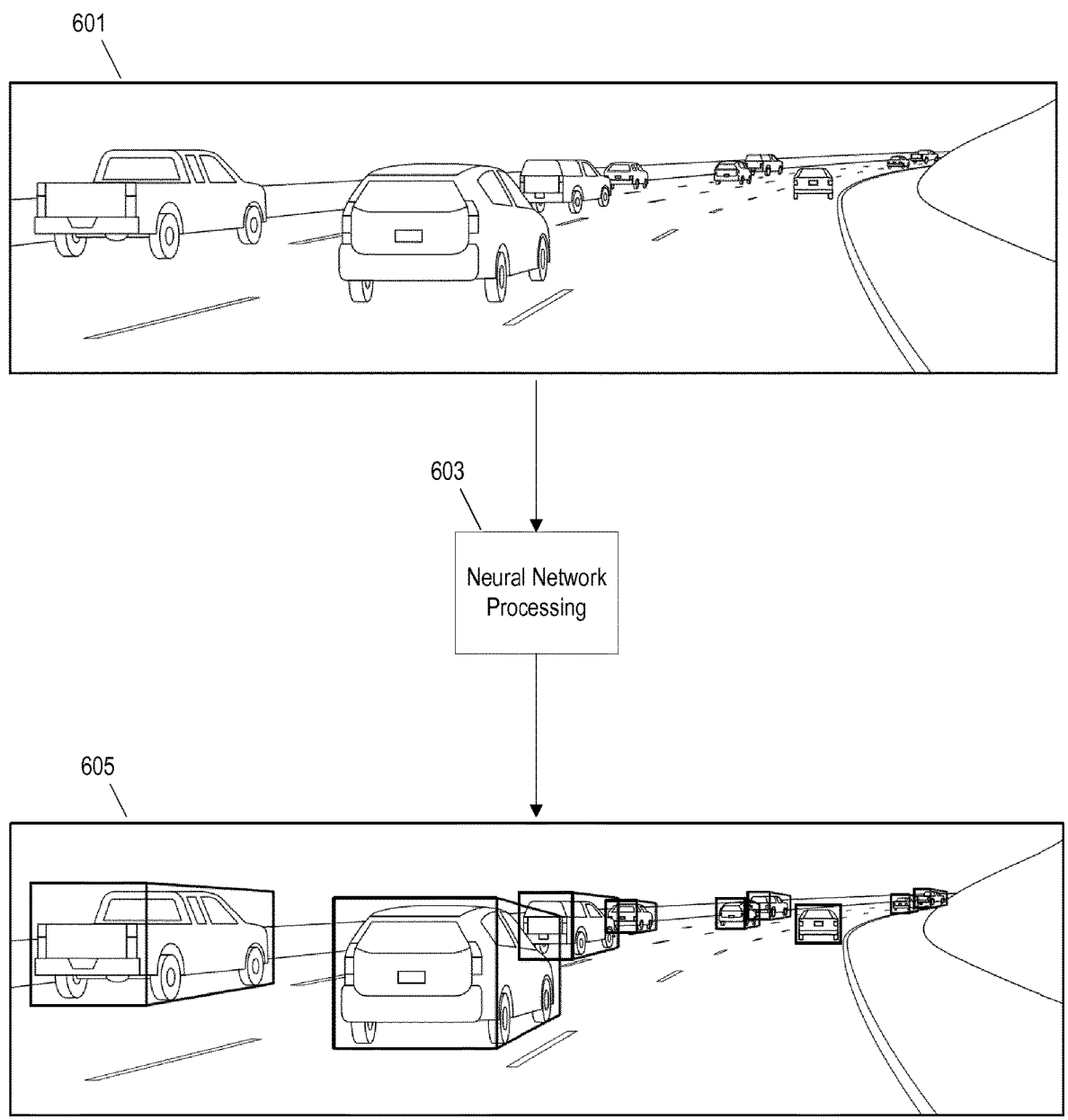
FIG. 7 is a flowchart of a method for detecting and annotating vehicles using neural-network processing.

In the example of FIG. 6, a camera 501 is positioned on a host vehicle. Images captured by the camera 501 are transmitted to an electronic controller 503. In some implementations, the electronic controller 503 is configured to include an electronic processor and a non-transitory, computer-readable memory storing instruction that are executed by the electronic processor of the electronic controller 503 in order to provide the image processing and vehicle detection functionality as described herein. The images captured by the camera 501 are processed (either by the electronic controller 503 or another computer system, as discussed further below) and are displayed on the screen of a display 505 with annotations identifying any detected vehicles overlaid onto the image. FIG. 7 illustrates an example of the operation of the system of FIG. 6. An image 601 is captured with a field of view including the roadway in front of the host vehicle. Neural network processing is applied to the captured image (at block 603) in order to determine a proper placement, size, and shape of the three-dimensional bounding boxes for vehicles detected in the captured image. The output shown on the display screen 505 (output image 605) includes at least a portion of the original image 601 captured by the camera and annotations overlaid onto the image 601 identifying any detected vehicles. In the example of FIG. 7, the output image 605 shows the 3D bounding box annotations identifying the vehicles that have been detected in the original image 601 captured by the camera 501.

The example of FIG. 7 and some other examples presented herein discuss displaying the camera image with the annotations identifying any detected vehicles on a screen that is viewable by an operator of the vehicle. However, in some implementations, the camera image and/or the three-dimensional bounding boxes are not displayed on any screen in the vehicle and instead the system may be configured to utilize the defined three-dimensional bounding boxes indicative of the position, size, etc. of detected vehicles only as input data to other automated systems of the vehicle. Other automated systems of the vehicle may be configured, for example, to use the position and size of the three-dimensional bounding boxes (which are indicative of the size and location of a particular vehicle operating on the roadway) to as input data for operations such as, for example, distance estimation (e.g., between the host vehicle and another detected vehicle), collision checking/warning, dynamic cruise control, and lane change assist. Furthermore, in some implementations, the detection of vehicles in the field of view may be based on analysis of the captured image(s) and also additional information captured by one or more additional vehicle sensors (e.g., radar, sonar, etc.). Similarly, in some implementations, the information regarding the detected vehicles as indicated by the placement of the three-dimensional bounding boxes is used as an input into one or more additional processing steps/operations where the detections of several sensors and timing information are combined (i.e., sensor fusion). In some implementations, the output of the sensor fusion process might then be displayed or, in other implementations, is again utilized by one or more vehicle systems without displaying any information to the operator of the vehicle. The resulting information from the image analysis and/or the combination of image analysis with information from one or more additional vehicle sensors may be used, for example, by the host vehicle's trajectory planning system.

The 3D bounding boxes can be defined by a fixed number of structured points. For example, in some implementations a 3D bounding box is defined by six points—four points defining the corners of a two-dimensional rectangle indicative of the rear of the vehicle and four points defining the corners of the two-dimensional quadrilateral indicative of the side of the vehicle (resulting in only 6 points because the two quadrilaterals defining a detected vehicle share one side and, therefore, share two points). In other implementations, the two quadrilaterals defining the 3D bounding box are calculated/determined as eight structured points defining the four corners of each of the two quadrilaterals.

In some implementations, the fixed number of structured points defining the 3D bounding box are defined in the two-dimensional space of the image while, in other implementations, the structured points are defined in three-dimensional space. In some implementations, the structured points defining the 3D bounding box are defined both in three-dimensional space (to be used as input data for automated vehicle control systems) and in two-dimensional space (to be displayed to the user in the output image). In some implementations, the system is configured to provide the fixed number of structured points defining the 3D bounding box (e.g., 6 points defining the 3D bounding box in 2D space, 6 points defining the 3D bounding box in 3D space, or 12 points defining the 3D bounding box in both 2D and 3D space) as a direct output of a machine-learning image processing routine. In other implementations, the system may be configured to provide the defined number of structured points as the output of the neural network processing in only 2D or 3D space and then apply a transformation to determine the structured points for the other coordinate frame (e.g., determining 3D coordinates for the structured points based on the 2D coordinates output by the neural network). In other implementations, the system may be configured to apply two separate neural network processing routines to determine the structured points in 2D space and in 3D space separately.

In some implementations, the system may be further configured to determine a set of eight structured points defining the 3D bounding box for the vehicle. The eight structured points collectively define the four corners of quadrilaterals for each of four different side surfaces of the 3D bounding box (e.g., two sides of the vehicle, a front of the vehicle, and a rear of the vehicle). In some implementations, the neural network is configured to output the entire set of eight structured points while, in other configurations, the neural network outputs structured points defining the rear or front of the vehicle and one additional side and the controller is configured to calculate the two additional structured points to define all eight corners of the 3D bounding box based on the set of six structured points output by the neural network. In some implementations, the system may be further configured to calculate and output four additional visibility probabilities that indicate which of the output points (and, in turn, which of the sides of the 3D bounding box) are visible and should be used for display or further processing.

The system may also be configured to apply other simplifications. For example, the system may be configured to assume during freeway driving situations that all detected vehicles are moving in the same direction and, as such, the rears and/or fronts of the vehicles can be estimated as rectangles. In other cases (e.g., with fairly flat roadways), the system may be configured to represent all sides and the rears/fronts of the detected vehicles as trapezoids (with only a small reduction in accuracy). By using fixed structures like trapezoids, fewer values per point need to be calculates because some points will share values (e.g., two corners of adjacent shapes that share an edge).

Figure 8A:
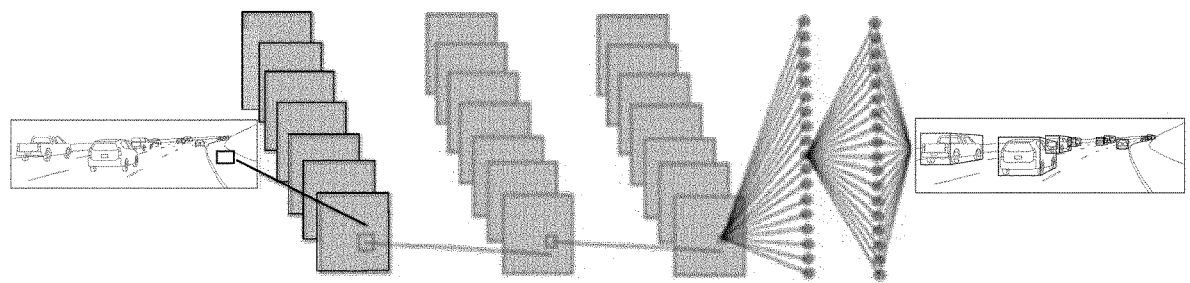
FIGS. 8A and 8B are schematic flowcharts of the method of FIG. 7 using convolutional neural network processing.
Figure 8B:
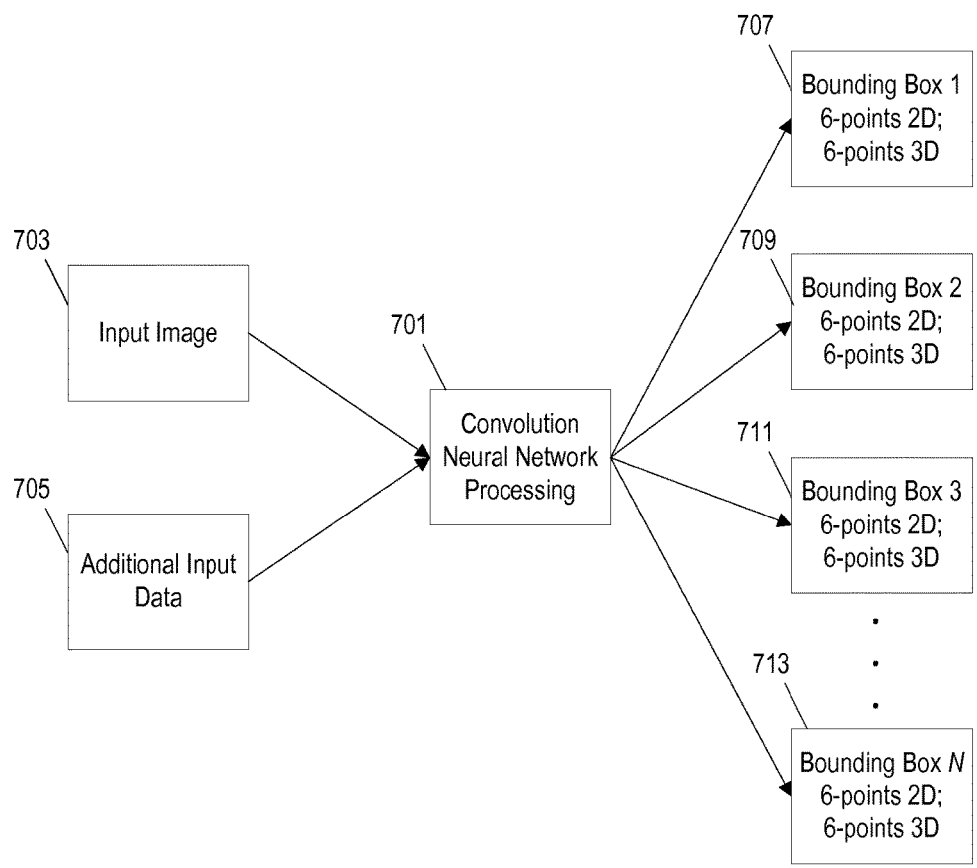

As discussed above, in the example of FIG. 7, a neural network process is applied to the capture image to directly yield the 3D bounding boxes (e.g., the points defining the 3D bounding box). FIGS. 8A and 8B further illustrate an example using a convolutional neural network. A convolutional neural network is a machine-learning image processing technique that analyzes an image to detect patterns and features and, based on the detected patterns/features (and, in some cases, additional contextual information), outputs information such as an identification of a detected object in the image. As shown in FIG. 8A, the convolutional neural network is trained to receive an input image from the camera and to output an output image including 3D bounding boxes for any vehicles detected in the original image. In some implementations, the neural network is configured to provide a dynamic number of outputs each defining the structured points for an individual bounding box corresponding to a different vehicle detected in the input image. FIG. 8B illustrates a particular example where the convolutional neural network 701 is configured to receive as input the original input image 703 captured by the camera and additional input data 705 including, for example, sensor data from one or more other vehicle sensors (e.g., sonar or radar), any bounding boxes that were defined for vehicles detected in a previous image, vehicle speed (for the host vehicle and/or for one or more other detected vehicles), vehicle steering changes, and/or acceleration. Based on these inputs, the convolutional neural network outputs a dynamic number of different sets of structured data points 707, 709, 711, 713 each defining a different 3D bounding box corresponding to vehicles detected in the input image 703. However, in other implementations, the convolutional neural network processing 701 is designed and trained to directly yield the dimensions and placement of the 3D bounding boxes based only on the input image 703 from the camera without any additional input data 705.

Neural networks—specifically convolutional neural networks such as illustrated in the examples of FIGS. 8A and 8B—are "supervised" machine learning techniques (i.e., they can be retrained and improved by user-identification of incorrect results). In some implementations, the neural network-based image processing system is developed and trained before being deployed in a vehicle. Accordingly, in some implementations, the system configuration illustrated in FIG. 6 can be used to simply capture the image, process the image to detect the presence of other vehicles, and output the results on a display without any user input device for supervised retraining. In fact, in some implementations, an output display (e.g., display 505 of FIG. 6) might not be utilized or even included in the system; instead, the image from the camera is processed to identify vehicles and the vehicle detection data (e.g., one or more combinations of points defining each detected vehicle in three-dimensional space) is used by other automated vehicle systems (e.g., fully or partially automated driving systems) without graphically displaying any indication of the identified vehicles in the image to the user.

Figure 9:
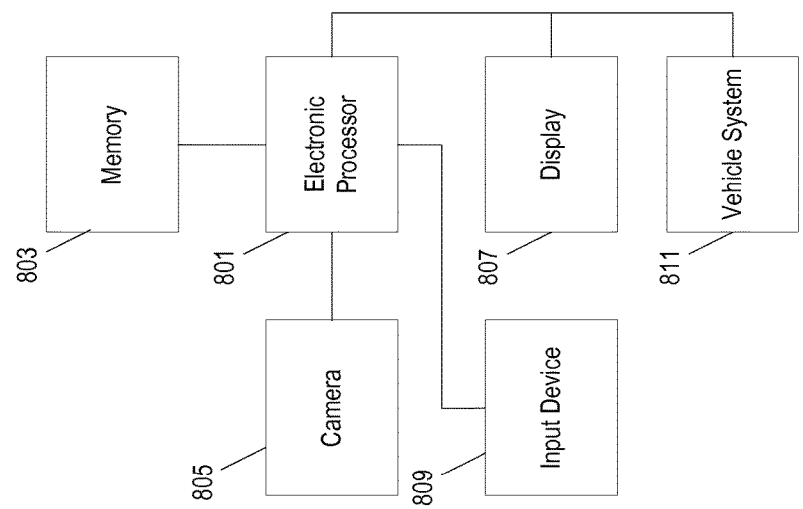
FIG. 9 is a block diagram of a system for detecting vehicles in camera image data using neural network processing and for retraining the neural network.

However, in other implementations, the system is further configured to receive user inputs to continue to retrain and improve the functioning of the convolutional neural network. FIG. 9 illustrates an example of a system that is configured to apply a convolutional neural network in order to detect vehicles as a combination of six points defining a 3D bounding box and that is further configured to retrain the convolutional neural network based on input from a user. The system includes an electronic processor 801 and a non-transitory computer-readable memory 803 storing instructions and training data for the neural network processing. A camera 805 is configured to periodically capture images and to transmit the captured images to the electronic processor 801. The electronic processor 801 processes the captured image(s), applies the neural network processing to detect vehicles in the captured image and to define three-dimensional bounding boxes for any detected vehicles.

As discussed above, the defined three-dimensional bounding boxes and/or information determined based at least in part on the three-dimensional bounding boxes may be provided by the electronic processor 801 to one or more additional vehicle systems 811 including, for example, vehicle systems configured to control a movement of the vehicle. For example, the vehicle system 811 may include one or more of an adaptive cruise control system, a lane change assist system, or other vehicle systems configured to automatically control or adjust vehicle steering, speed, acceleration, braking, etc. Vehicle systems 811 may also include other systems that, for example, may be configured to calculate/monitor a distance between the host vehicle and other detected vehicles including, for example, a collision checking/warning system.

The electronic processor 801 is also configured to generate an output image that includes at least a portion of the image captured by the camera 805 and any 3D bounding boxes indicating vehicles detected by the neural network image processing. The output image is then transmitted by the electronic processor 801 to the display 807 where it is shown on the screen of the display 807. The system of FIG. 9 also includes an input device 809 configured to receive inputs from a user that are then used to retrain the neural network. In some implementations, the display 807 and the input device 809 can be provided together as a touch-sensitive display.

Figure 10:
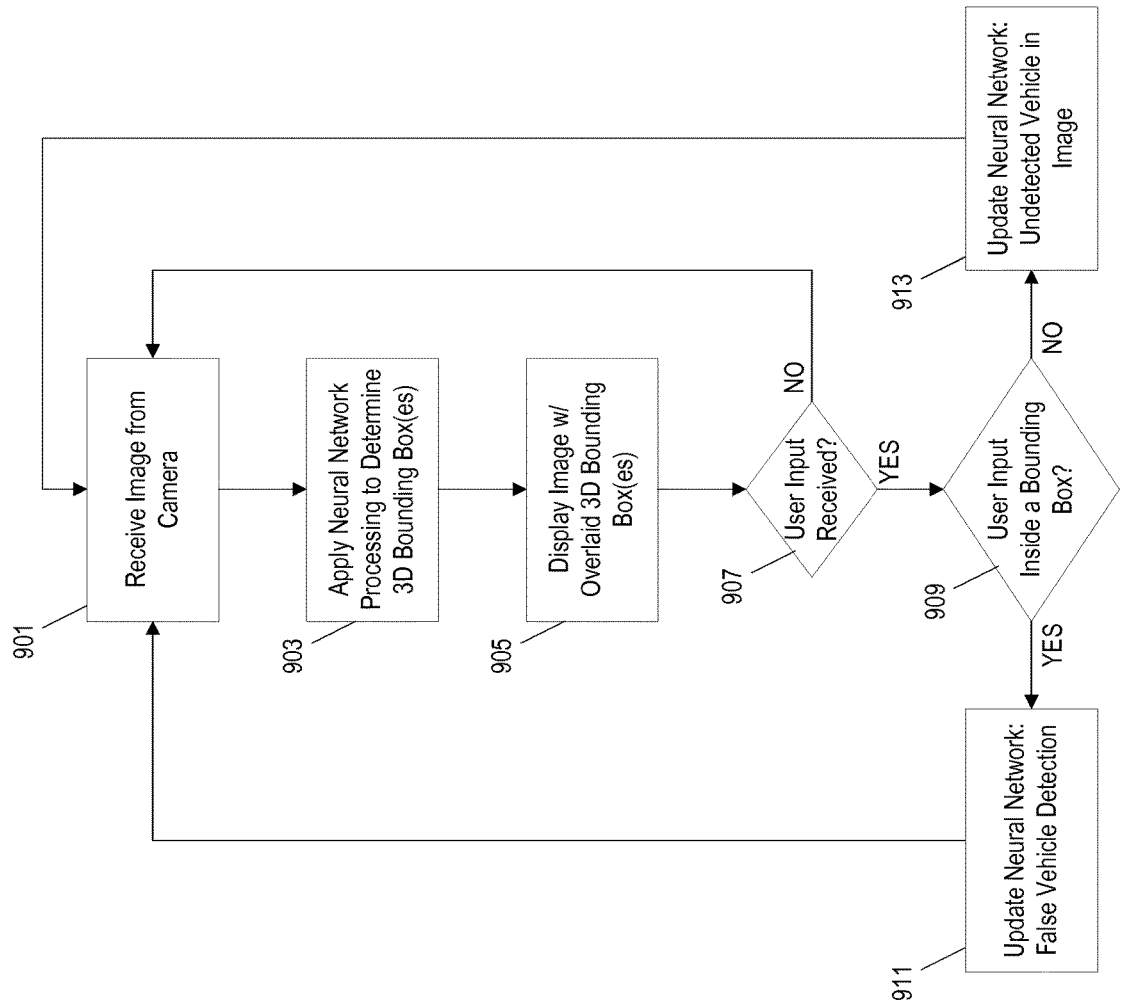
FIG. 10 is a flowchart of a method for detecting vehicles in camera image data and for retraining the neural network using the system of FIG. 9.

In some implementations—including, for example, implementations utilizing a touch-sensitive display, the system may be configured to enable the user to retrain the neural network by identifying (e.g., by touching on the touch-sensitive display) any vehicles in the displayed image that were not automatically detected by the system and any displayed 3D bounding boxes that do not correctly correspond to any vehicle. FIG. 10 illustrates an example of a method implemented by the electronic processor 801 to provide this type of retraining. An image is received from the camera (at block 901, "Receive Image from Camera") and the neural network processing is applied to determine the position and dimensions of any 3D bounding boxes each defined by a set of structural points in 2D and/or 3D space (at block 903, "Apply Neural Network Processing to Determine 3D Bounding Box(es)"). The image is then shown on the display with the 3D bounding boxes (if any) overlaid onto the image (at block 905, "Display Image with Overlaid 3D Bounding Box(es)"). The system then monitors the input device (e.g., the touch-sensitive display) for any user inputs (at block 907, "User Input Received?"). If no user inputs are received, then the system proceeds to processing the next image received from the camera (repeating blocks 901, 903, and 905).

In this particular example, user inputs are received by "touches" on the touch-sensitive display. Therefore, when a "touch" input is detected, the system determines whether that touch input was received inside a 3D bounding box shown on the display (at block 909, "User Input Inside a Bounding Box?"). If so, the system determines that the user input is indicating that a displayed 3D bounding box has falsely or inaccurately indicated a detected vehicle (e.g., there is no vehicle in the image corresponding to the bounding box or the bounding box does not properly align with the vehicle in the image). The system proceeds to retrain the neural network based on this input (at block 911, "Update Neural Network: False Vehicle Detection"). Conversely, if the touch input was received at a location outside of any of the displayed 3D bounding boxes, then the system determines that the user input is identifying a vehicle shown in the image that was not detected by the neural network processing. The neural network is retrained accordingly based on this user input (at block 913, "Update Neural Network: Undetected Vehicle in Image"). The updated/retrained neural network is then used to processes the next image received from the camera (repeating blocks 901, 903, and 905).

In some implementations, the system is further configured to apply additional processing to the location selected by the user in order to automatically detect a vehicle at a selected location corresponding to an undetected vehicle while, in other implementations, the system is configured to prompt the user to manually place a new 3D bounding box at the selected location corresponding to the undetected vehicle. In some implementations, the system is configured to display this prompt for manual placement of the new 3D bounding box in real-time while, in other implementations, images for which a selection of an undetected vehicle is received are stored to memory and the system output the image with a prompt for manual placement of the new 3D bounding box at a later time (e.g., when the vehicle is stopped).

Furthermore, in some implementations, the system is further configured to provide retraining data as a refinement to the displayed/output 3D bounding boxes. For example, the system may be configured to enable to the user to selectively and manually adjust the dimensional of a 3D bounding box after it is displayed on the screen for a detected vehicle. After the user adjusts the shape, position, and/or size of the bounding box to more accurately indicate the rear/front and side of the vehicle, the system may use this refinement as additional retraining data to retrain the neural network.

Figure 11:
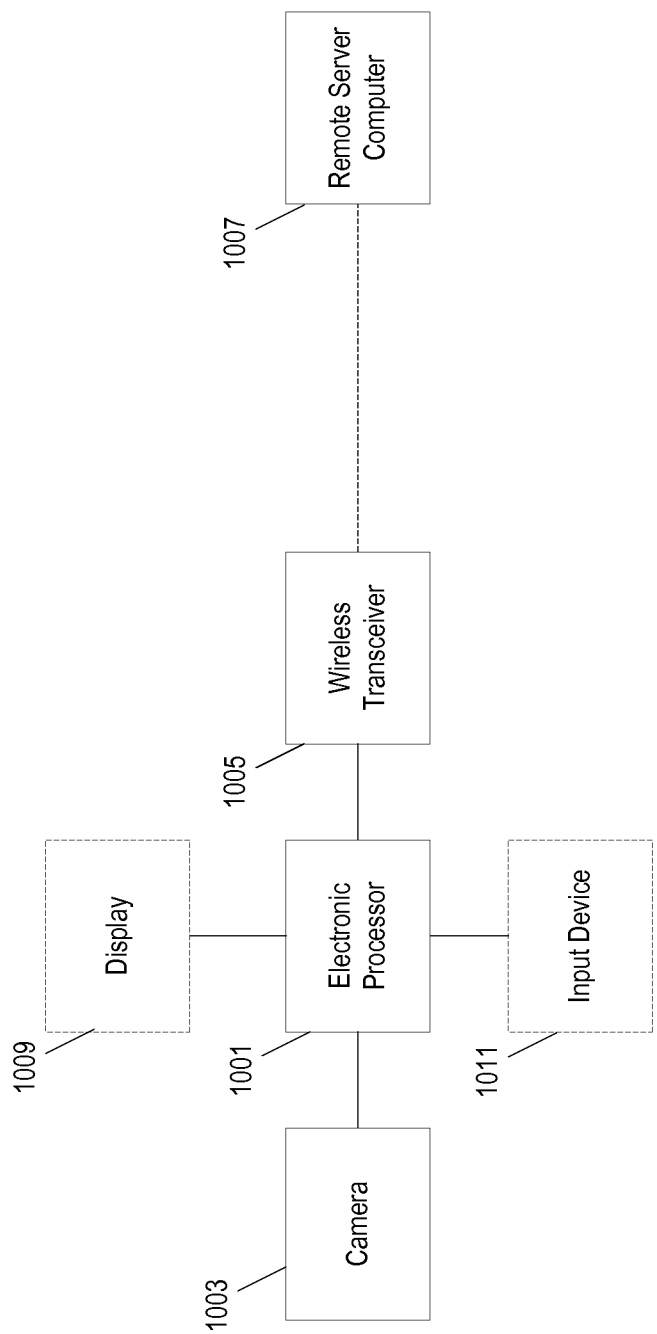
FIG. 11 is a block diagram of a system for detecting vehicles in camera image data and for retraining the neural network using a remote server computer.

In the examples discussed above, images are captured and processed and the neural network is retrained locally by the electronic processor 801 and the user in the vehicle. However, in other implementations, the system may be configured to interact with a remote server. FIG. 11 illustrates one example of such a system that includes an electronic processor 1001, a camera 1003, and a wireless transceiver 1005 configured to communicate wirelessly with a remote server computer 1007. In various implementations, the wireless transceiver 1005 can be configured to communicate with the remote server computer 1007 using one or more wireless modalities including, for example, cellular communications networks.

In various implementations, the remote server computer 1007 can be configured to perform some or all of the image processing and/or neural network retraining in addition to or instead of the electronic processor 1001. For example, the system of FIG. 10 might be configured to transmit the image data captured by the camera 1003 to the remote server computer 1007 which is configured to process the image data using the neural network and to transmit back to the wireless transceiver 1005 six-point combinations identifying the 3D bounding boxes for any vehicles detected in the image. By performing the image processing at the remote server computer 1007, the computational load is shifted from the local electronic processor 1001 in the vehicle to the remote server computer 1007.

The retraining of the neural network can also be shifted to the remote server computer 1007. For example, a staff of employees can review images received and processed by the remote server computer 1007 either in real-time or at a later time to identify any false positive detections or missed vehicle detections in the captured images. This information is then used to retrain the neural network. In addition to reducing computational complexity and reducing (or entirely removing) the retraining burden from the operator of the vehicle, in implementations where multiple vehicles are configured to interact with the remote server computer, a larger volume of retraining data can be captured and processed resulting in a more robustly trained neural network.

In the example discussed above, the remote server computer is configured to perform the image processing and the retraining of the neural network. Accordingly, in some implementations, the display 1009 and/or the input device 1011 might not be included in the host vehicle. However, in other implementations, some or all of the image processing and/or the retraining functionality is implemented by the local electronic processor 1001 instead of or in addition to the functions performed by the remote server computer 1007. For example, the system of FIG. 10 may be configured to apply the neural network image processing at the local electronic processor 1001 and to transmit the image data with the overlaid 3D boundary boxes to the remote server computer 1007. Instead of retraining the neural network locally by the user/driver of the vehicle, retraining of the neural network is then performed remotely using this collected image/output data and image/output data received from any other host vehicles connected to the remote server computer 1007. The remote server computer 1007 then updates the neural network stored and implemented by the electronic processor 1001 based on the remote/collective retraining periodically or on request.

Similarly, some implementations, the system might be configured to apply the neural network image processing at the local electronic processor 1001 and to receive retraining inputs from the user through the local input device 1011 identifying false positives and undetected vehicles as discussed above in reference to FIG. 10. However, instead of retraining the neural network locally, the retraining inputs received by the input device 1011 and the corresponding images are saved to a memory. The system is further configured to periodically or upon request upload the retraining inputs and the corresponding images to the remote server computer 1007 which, in turn, develops a retrained neural network based on the retraining inputs/images received from multiple different host vehicles connected to the remote server computer 1007 and transmits the updated/retrained neural network to the electronic processor 1001 for use.

Finally, although some of the examples above discuss training and retraining of the neural network based on manual user inputs (either from a user operating the vehicle or by another person on the remote server computer side), in other implementations, the training and retraining of the neural network can be accomplished using another vehicle detection algorithm to verify the correct presence/position of vehicles. Furthermore, in some implementations, the system can be configured to automatically determine a confidence level of vehicle detections in an image and to automatically forward images flagged as "low confidence" images to the remote server computer for further manual or automated processing and for retraining of the neural network. Additionally, in some implementations, it is possible to apply some of the techniques and systems described herein to systems that use sensor inputs instead of or in addition to a camera as the input to the detection system.

Thus, the invention provides among other things, systems and methods for detecting and annotating other vehicles in images directly using neural network processing. Various features and advantages are set forth in the following claims.

What is claimed is:

1. A method of detecting and tracking a vehicle near a host vehicle, the method comprising:
    receiving, by an electronic controller, an input image from a camera mounted on the host vehicle;
    applying, by the electronic controller, a neural network configured to output a definition of a three-dimensional bounding box based at least in part on the input image, the three-dimensional bounding box indicating a size and a position of a detected vehicle in a field of view of the input image, the three-dimensional bounding box including a first quadrilateral shape outlining a rear or front of the detected vehicle and a second quadrilateral shape outlining a side of the detected vehicle;
    displaying an output image on a display screen, the output image including at least a portion of the input image and an indication of the three-dimensional bounding box overlaid onto the input image;
    receiving a user input indicative of a selection of a location on the output image outside of the three-dimensional bounding box;
    determining, based on the user input, that an undetected vehicle is present within the field of the input image at the location corresponding to the user input; and
    retraining the neural network based on the user input indicative of the undetected vehicle.

2. The method of claim 1, further comprising:
    receiving a user input indicative of a selection of a location on the output image within the three-dimensional bounding box;
    determining, based on the user input, that the three-dimensional bounding box is indicative of an incorrect detection of a vehicle by the neural network; and
    retraining the neural network based on the incorrect detection.

3. The method of claim 1, further comprising:
    applying a vehicle detection routine to the input image at the location corresponding to the user input; and
    defining a second three-dimensional bounding box based on the vehicle detection routine,
    wherein retraining the neural network includes retraining the neural network to output the definition of the second three-dimensional bounding box based at least in part on the input image.

4. The method of claim 1, further comprising:
    prompting a user to manually position a second three-dimensional bounding box relative to the undetected vehicle in the input image; and
    defining a second three-dimensional bounding box based on a second user input received in response to the prompt,
    wherein retraining the neural network includes retraining the neural network to output the definition of the second three-dimensional bounding box based at least in part on the input image.

5. The method of claim 1, further comprising automatically operating a vehicle system to control a movement of the host vehicle based at least in part on the three-dimensional bounding boxes.

6. The method of claim 5, further comprising determining a distance between the host vehicle and the detected vehicle based at least in part on the three-dimensional bounding box, and wherein automatically operating a vehicle system includes automatically adjusting a speed of the host vehicle based at least in part on the determined distance between the host vehicle and the detected vehicle.

7. The method of claim 5, wherein automatically operating a vehicle system includes automatically adjusting, based at least in part on a position of the three-dimensional bounding box, at least one selected from a group consisting of a steering of the host vehicle, an acceleration of the host vehicle, a braking of the host vehicle, a defined trajectory of the host vehicle, and a signaling of the host vehicle.

8. The method of claim 1, wherein the definition of the three-dimensional bounding box consists of a set of six structured points defining four corners of the first quadrilateral shape and four corners of the second quadrilateral shape, wherein two corners of the first quadrilateral shape are the same as two corners of the second quadrilateral shape.

9. The method of claim 8, wherein the set of six structured points define the corners of the first quadrilateral shape and the corners of the second quadrilateral shape in a three-dimensional coordinate system.

10. The method of claim 8, wherein the set of six structured points define the corners of the first quadrilateral shape and the corners of the second quadrilateral shape in a two-dimensional coordinate system of the input image.

11. The method of claim 1, wherein the definition of the three-dimensional bounding boxes consists of
    a first set of six structured points defining four corners of the first quadrilateral shape and the four corners of the second quadrilateral shape in a two-dimensional coordinate system, and
    a second set of six structured points defining the corners of the first quadrilateral shape and the corners of the second quadrilateral shape in a three-dimensional coordinate system.

12. The method of claim 1, wherein the neural network is further configured to output definitions of a plurality of three-dimensional bounding boxes based at least in part on the input image, wherein each three-dimensional bounding box of the plurality of three-dimensional bounding boxes indicates a size and a position of a different one of a plurality of vehicles detected in the field of view of the input image.

13. A vehicle detection system, the system comprising:
    a camera positioned on a host vehicle;
    a touch-sensitive display screen;
    a vehicle system configured to control a movement of the host vehicle;
    an electronic processor; and
    a memory storing instructions that, when executed by the electronic processor, cause the vehicle detection system to
        receive an input image from the camera, the input image having a field of view including a roadway surface on which the host vehicle is operating,
        apply a neural network configured to provide an output defining a plurality of three-dimensional bounding boxes each corresponding to a different one of a plurality of vehicles detected in the field of view of the input image, wherein each three-dimensional bounding box is defined by the output of the neural network as a set of structured points defining a first quadrilateral shape positioned around a rear of a detected vehicle and a second quadrilateral shape positioned around a side of the detected vehicle, wherein the first quadrilateral shape is adjacent to the second quadrilateral shape, cause the display screen to display an output image including at least a portion of the input image and each of the plurality of three-dimensional bounding boxes overlaid onto the input image, receive a user input through the touch-sensitive display, the user input being indicative of a selection of a location on the output image outside of the plurality of three-dimensional bounding boxes, determine, based on the user input, that an undetected vehicle is present within the field of the input image at the location corresponding to the user input, and retrain the neural network based on the user input indicative of the undetected vehicle.

14. The method of claim 1, wherein displaying the output image on the display screen includes displaying the output image on a touch-sensitive display screen positioned within the host vehicle, and wherein receiving the user input includes receiving the user input through the touch-sensitive display screen positioned within the host vehicle.

15. The vehicle detection system of claim 13, wherein the touch-sensitive display is positioned within the host vehicle.

16. The method of claim 1, wherein applying the neural network configured to output the definition of the three-dimensional bounding box based at least in part on the input image includes applying the neural network configured to receive only a single image as input to the neural network and to generate the definition of the three-dimensional bounding box as the output in response to receiving the input image as the input to the neural network.

* * * * *